US011778126B2

(12) United States Patent
Saito

(10) Patent No.: US 11,778,126 B2
(45) Date of Patent: Oct. 3, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takuya Saito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/583,040

(22) Filed: Jan. 24, 2022

(65) Prior Publication Data
US 2022/0263978 A1    Aug. 18, 2022

(30) Foreign Application Priority Data
Feb. 12, 2021   (JP) ................ 2021-021064

(51) Int. Cl.
*H04N 1/62* (2006.01)
*G06F 3/12* (2006.01)
*H04N 1/00* (2006.01)
*H04N 1/60* (2006.01)

(52) U.S. Cl.
CPC ............ *H04N 1/62* (2013.01); *G06F 3/1208* (2013.01); *G06F 3/1256* (2013.01); *G06F 3/1284* (2013.01); *H04N 1/00005* (2013.01); *H04N 1/00013* (2013.01); *H04N 1/00015* (2013.01); *H04N 1/00037* (2013.01); *H04N 1/0044* (2013.01); *H04N 1/00411* (2013.01); *H04N 1/00795* (2013.01); *H04N 1/603* (2013.01)

(58) Field of Classification Search
CPC .. H04N 1/62; H04N 1/00005; H04N 1/00013; H04N 1/00015; H04N 1/00037; H04N 1/00411; H04N 1/00795; H04N 1/603; G06F 3/1208; G06F 3/1256; G06F 3/1284
USPC ................................... 358/1.9, 1.15
See application file for complete search history.

(56) References Cited

U.S. PATENT DOCUMENTS

| 2007/0109569 | A1* | 5/2007 | Eschbach .................. G06T 7/90 358/1.9 |
| 2008/0137942 | A1* | 6/2008 | Hong ....................... H04N 1/62 382/167 |
| 2016/0019008 | A1* | 1/2016 | Matsumoto ........... G06F 3/1256 358/1.15 |
| 2017/0366709 | A1* | 12/2017 | Horita .................. H04N 1/6005 |

FOREIGN PATENT DOCUMENTS

| JP | 2011-188484 | 9/2011 |
| JP | 2016-139868 | 8/2016 |

* cited by examiner

*Primary Examiner* — Quang N Vo
(74) *Attorney, Agent, or Firm* — Venable LLP

(57) ABSTRACT

An image processing apparatus includes: a designating unit configured to designate a color; a reading unit configured to read a document to generate a document image; a conversion unit configured to convert a color of a pixel in the document image to a specific color based on a designated color designated by the designating unit; and a specification unit configured to specify a graphic region in the document image. The conversion unit is configured not to convert a color of a pixel in the graphic region specified by the specification unit to the specific color.

12 Claims, 13 Drawing Sheets

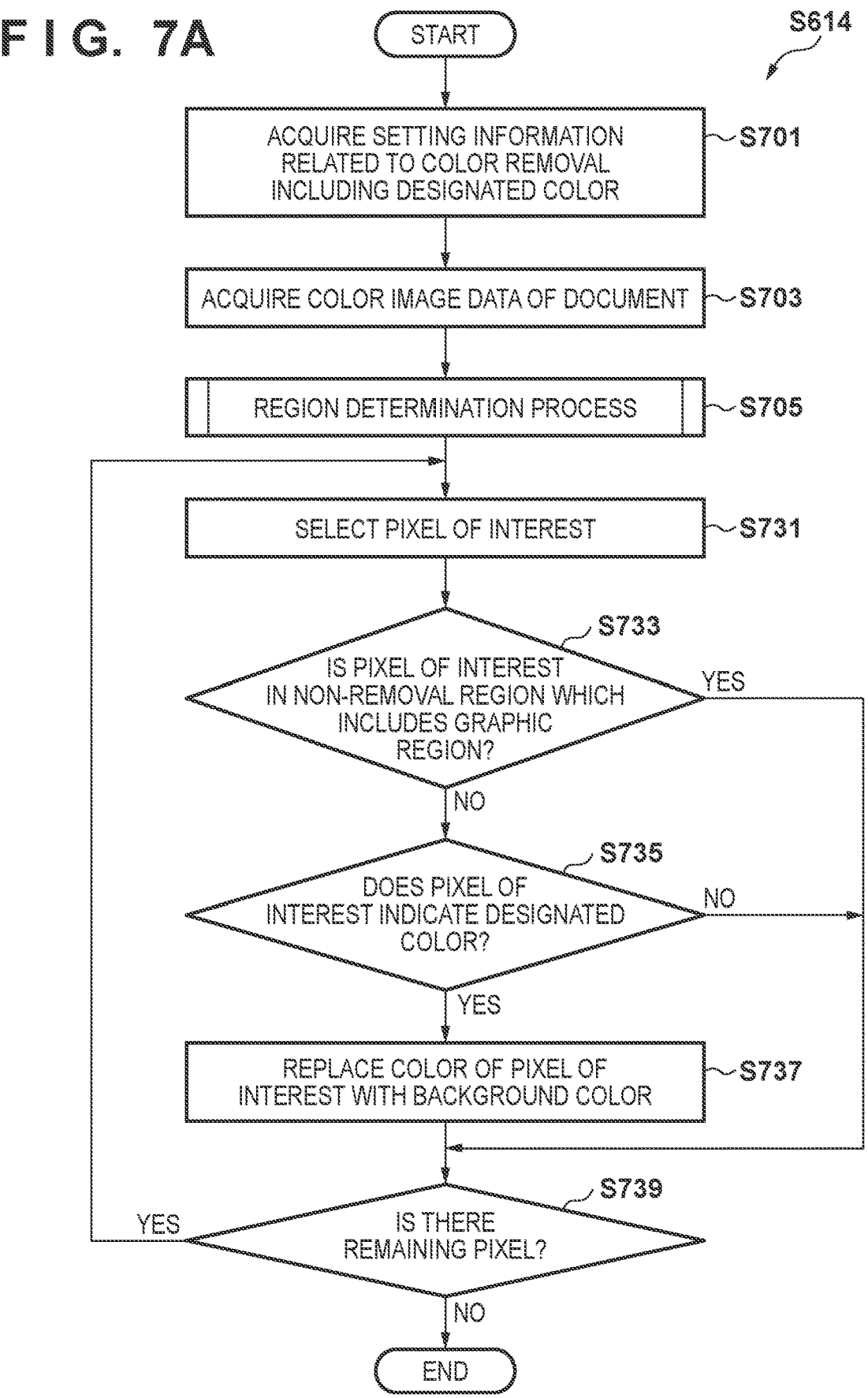

IMAGE PROCESSING APPARATUS, IMAGE PROCESSING METHOD, AND STORAGE MEDIUM

BACKGROUND OF THE INVENTION

Field of the Invention

The present disclosure relates to an image processing apparatus, an image processing method, and a storage medium.

Description of the Related Art

Although there has been progress in digitization, there are still many occasions today where characters and symbols are written on printed materials (e.g., conference handouts) with writing instruments. However, when later duplicating and sharing the materials with others, it may be desirable to erase handwritten content. In order to satisfy such a desire, it has been proposed to incorporate, in apparatuses such as scanners, copiers, and multi-function peripherals, a so-called color dropout function for removing, from the image data of an optically-read document, a color designated by a user (refer to Japanese Patent Laid-Open No. 2011-188484 and Japanese Patent Laid-Open No. 2016-139868).

The color dropout function proposed in Japanese Patent Laid-Open No. 2011-188484 allows the user to designate, on a setting screen for displaying a color plane, a range of colors that should be removed and converts colors in image data that fall within that range to white using a look-up table method. However, a technique that uniformly removes designated colors also removes the same colors in the non-handwritten portion, thereby reducing the image quality of a read image. For example, when an attempt is made to erase characters written with a red pen on a material, a red subject in a photograph inserted in the material can also end up being erased.

Japanese Patent Laid-Open No. 2016-139868 proposes, in order to avoid unintentional deterioration in image quality of photographic regions, determining halftone dot regions, which have a gradation representation, in image data as photographic regions, and not performing color removal in the photographic regions.

SUMMARY OF THE INVENTION

However, the photographic regions are not the only regions in which deterioration in image quality caused by color removal becomes a problem. For example, multiple colors may be used for graphic elements such as graphs and figures, which are often inserted into conference materials. However, since sub-regions of the graphic elements have almost uniform densities when viewed locally, they are not determined as photographic regions with the determination method based on the gradation representation proposed in Japanese Patent Laid-Open No. 2016-139868 and will not be excluded from being a color removal target. The user may also not wish to remove color in sub-regions of those other than the regions of graphic elements or may wish to remove color only in a specific sub-region.

Thus, there is still a need for a mechanism that can remove a designated color from image data of a document while preventing an undesirable deterioration in image quality.

According to an aspect, there is provided an image processing apparatus including: a designating unit configured to designate a color; a reading unit configured to read a document to generate a document image; a conversion unit configured to convert a color of a pixel in the document image to a specific color based on a designated color designated by the designating unit; and a specification unit configured to specify a graphic region in the document image; wherein the conversion unit is configured not to convert a color of a pixel in the graphic region specified by the specification unit to the specific color.

Further features of the present invention will become apparent from the following description of exemplary embodiments (with reference to the attached drawings).

BRIEF DESCRIPTION OF THE DRAWINGS

FIG. 7A is a flowchart illustrating an example of a flow of image processing according to the first embodiment.

DESCRIPTION OF THE EMBODIMENTS

Figure 1:
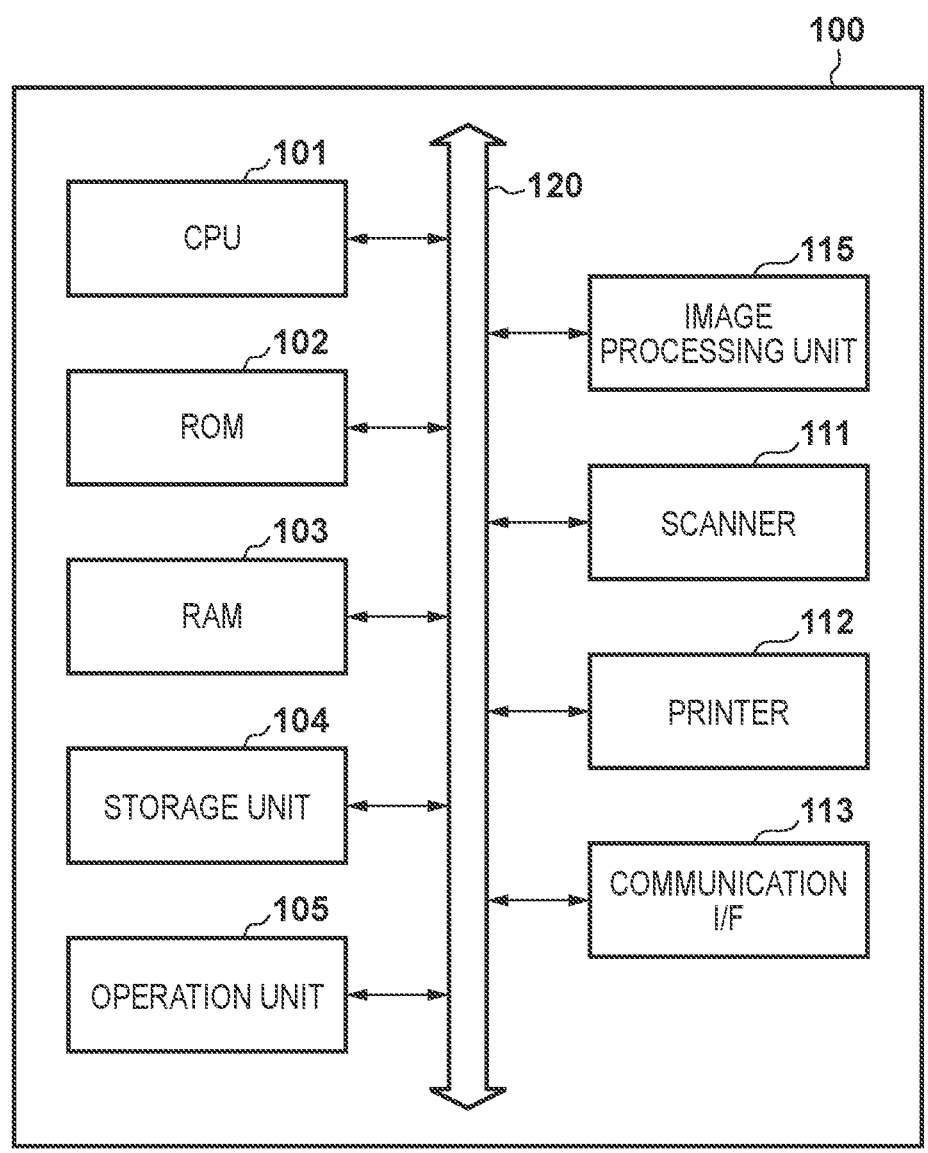
FIG. 1 is a block diagram illustrating an example of a basic configuration of a multi-function peripheral.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

1. Introduction

In this specification, examples in which a technique according to the present disclosure is applied to a multi-function peripheral (MFP) will be mainly described. However, the technique according to the present disclosure is not limited to such examples and is widely applicable to image processing apparatuses in general (including, for example, copiers, printers, scanners and facsimile machines). Also, unless otherwise specified, each of the components to be described below, such as apparatuses, devices, modules and chips, may consist of a single entity or a plurality of physically different entities.

<1-1. Basic Configuration of Apparatus>

FIG. 1 is a block diagram illustrating an example of a basic configuration of a multi-function peripheral. A multi-function peripheral 100 illustrated in FIG. 1 includes a CPU 101, a ROM 102, a RAM 103, a storage unit 104, an operation unit 105, a scanner 111, a printer 112, a communication I/F 113, an image processing unit 115, and a bus 120. The CPU (Central Processing Unit) 101 is a processor for controlling the general functions of the multi-function peripheral 100. The ROM (Read Only Memory) 102 is a non-volatile memory for storing, in advance, a computer program to be executed by the CPU 101. The ROM 102 may be, for example, a flash memory. The RAM (Random Access Memory) 103 is a volatile memory providing the CPU 101 with a work storage region. When the computer program is executed by the CPU 101, for example, the RAM 103 temporarily stores program data, control data, and image data to be processed. The storage unit 104 is utilized as a so-called auxiliary storage device and can store image data of many images and other data. The storage unit 104 may be, for example, an HDD (Hard Disk Drive). The operation unit 105 provides a user interface to a user of the multi-function peripheral 100. The operation unit 105 includes, for example, a display device for displaying information and images and an input device for receiving user inputs. The scanner 111 is a reading unit that generates image data by reading a document. Depending on the setting of the reading, the image data generated by the scanner 111 can be color image data or monochrome image data. The printer 112 is an image forming unit that forms an image on a printing medium based on image data designated in a job. In copy mode, after the image data generated by the scanner 111 has been processed by the image processing unit 115 to be described later, an image based on the processed image data is formed by the printer 112 (that is, a document is copied). In print mode, an image based on the image data designated by a user is formed on a printing medium by the printer 112 (i.e., an image is printed). The communication interface (I/F) 113 is an interface for the multi-function peripheral 100 to communicate with other apparatuses via a network. The image processing unit 115 is a processing circuit for performing a variety of image processing, such as color space conversion, size change, and noise reduction, for example, on image data outputted from the scanner 111 and image data inputted to the printer 112. The functions such as region determination and color removal to be described in connection with the embodiments to be described below may be implemented by one of the CPU 101 and the image processing unit 115 or by both cooperating with each other. The bus 120 is a signal line that connects the CPU 101, the ROM 102, the RAM 103, the storage unit 104, the operation unit 105, the scanner 111, the printer 112, the communication I/F 113, and the image processing unit 115 to each other.

<1-2. Explanation of Problems>

Figure 2:
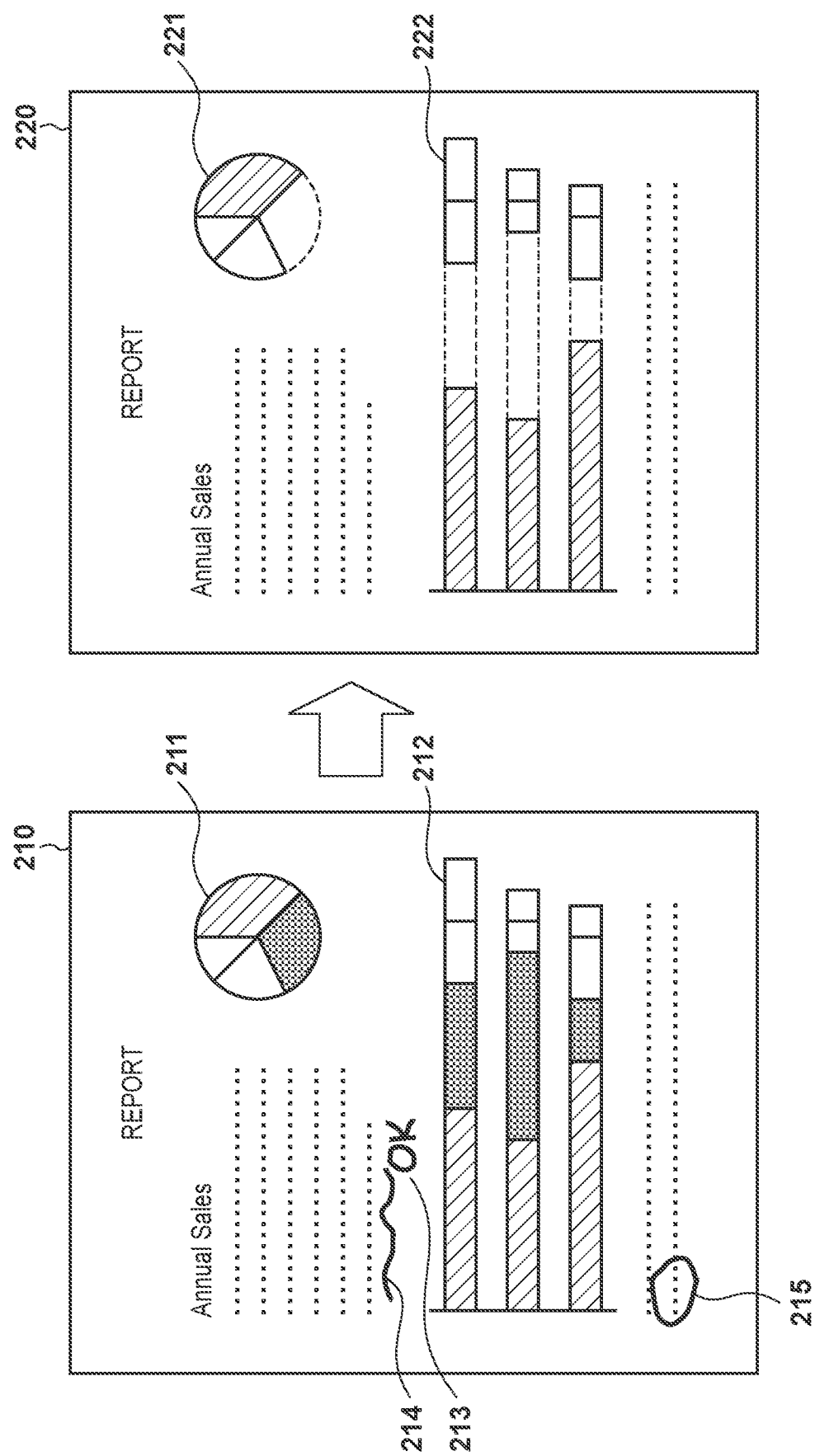
FIG. 2 is an explanatory diagram for explaining the disadvantages of a conventional color dropout function.

On the left in FIG. 2, an appearance of a document 210 is illustrated as an example of something to be read by the scanner 111. The document 210 is, for example, a conference handout and includes, in addition to text, graphic elements 211 and 212. The graphic element 211 is a pie chart, and graphic element 212 is a bar graph. In addition, characters 213 and symbols 214 and 215 have been handwritten on the document 210. Assume that the handwritten portions are red and some of the graphic elements 211 and 212 have also been depicted in red. On the right in FIG. 2, an output image 220 for when, in a conventional color dropout function, red has been designated as the color that should be removed is illustrated. In the output image 220, the characters 213 and symbols 214 and 215 have been successfully removed, but the red portions of the graphic elements 211 and 212 are missing against the user's intention.

As will be described in more detail in the next section, the technique according to the present disclosure provides a mechanism capable of appropriately removing designated colors from the image data of a document while preventing such deterioration in image quality undesirable to users.

2. First Embodiment

<2-1. Functional Configuration>

Figure 3:
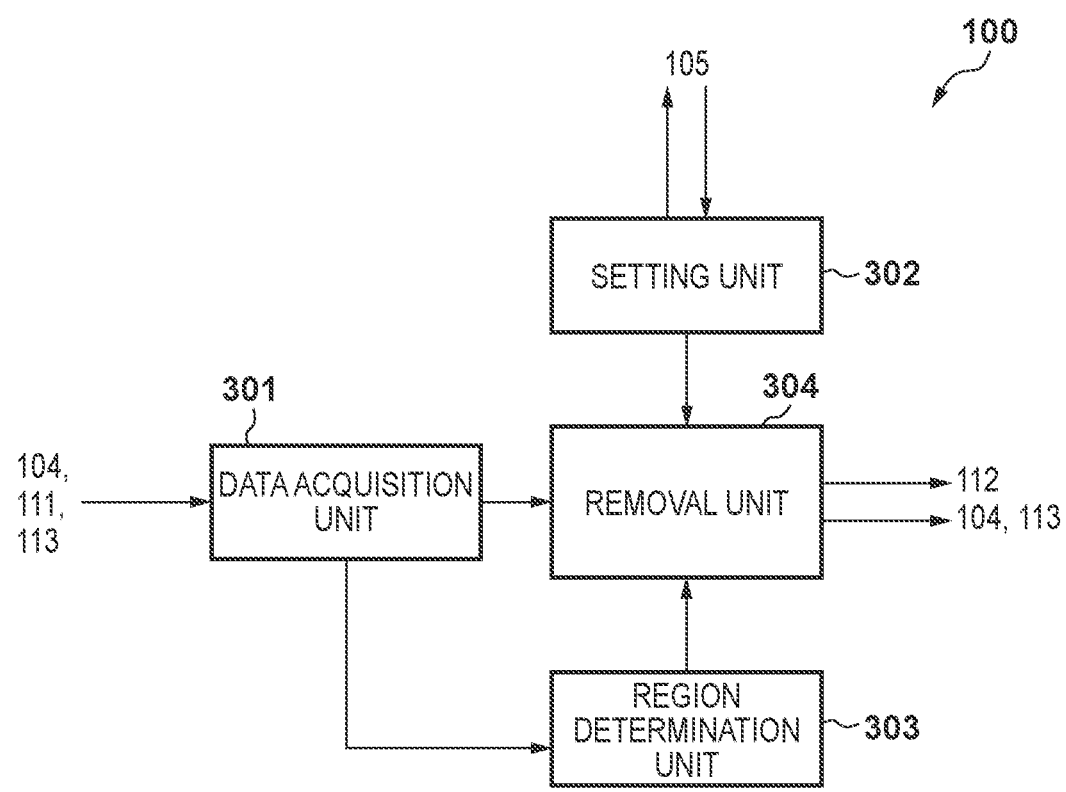
FIG. 3 is a block diagram illustrating an example of a logical configuration of a multi-function peripheral according to a first embodiment.

FIG. 3 is a block diagram illustrating an example of a logical configuration of the multi-function peripheral 100 according to a first embodiment. Referring to FIG. 3, the multi-function peripheral 100 includes a data acquisition unit 301, a setting unit 302, a region determination unit 303, and a removal unit 304.

(1) Data Acquisition Unit

The data acquisition unit 301 acquires color image data to which a color dropout function of the present embodiment is to be applied. For example, the data acquisition unit 301 may cause the scanner 111 to read a document and then acquire color image data generated by the scanner 111. The data acquisition unit 301 may acquire color image data stored in the storage unit 104 or color image data received from another apparatus via the communication I/F 113. The data acquisition unit 301 outputs the acquired color image data to the region determination unit 303 and the removal unit 304.

(2) Setting Unit

Figure 4:
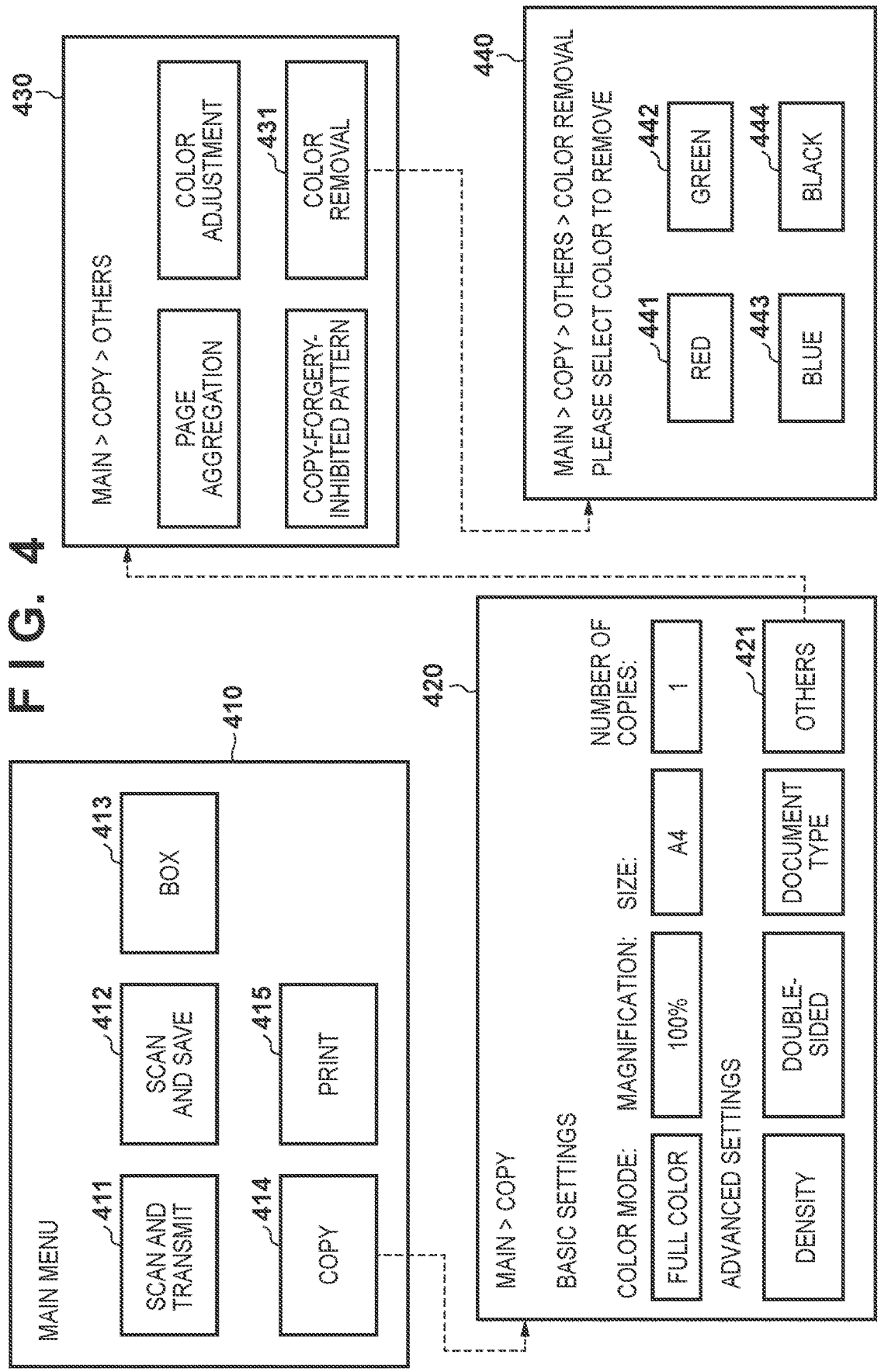
FIG. 4 is an explanatory diagram for explaining an example of a setting GUI that can be displayed on a screen in the first embodiment.

The setting unit 302 acquires, via the operation unit 105, setting information related to removal of color from color image data and sets the acquired setting information in the removal unit 304. The setting information related to color removal includes at least a designated color to be removed from the color image data. For example, the setting unit 302 displays, on the screen of the operation unit 105, a setting GUI (Graphical User Interface) for accepting settings related to color removal and acquires the setting information based on user inputs to the setting GUI. FIG. 4 illustrates an example of a setting GUI that can be displayed on the screen of the operation unit 105 in the present embodiment.

A main menu 410 on the upper left in FIG. 4 is a menu for displaying a selection of the main functions of the multi-function peripheral 100. The main menu 410 includes buttons 411, 412, 413, 414, and 415. The button 411 is a button for invoking a "scan and transmit" function. The button 412 is a button for invoking a "scan and save" function. The button 413 is a button for invoking a "box" function (for using data stored in a storage device). The button 414 is a button for invoking a "copy" function. The button 415 is a button for invoking a "print" function. The mechanism of color removal to be described in this specification is applicable to any of these functions, but here, an example in which it is applied to the "copy" function will be described. When the user operates (e.g., touches) the button 414, the GUI transitions from the main menu 410 to a copy setting menu 420. The copy setting menu 420 includes, for example, color mode (full color/monochrome), magnification, paper size, and number of copies, as basic setting items. The copy setting menu 420 also includes, for example, density, single-sided/double-sided, document type, and other settings, as advanced setting items. When the user selects "full color" as the color mode and operates a button 421 ("other settings"), the GUI transitions from the copy setting menu 420 to another settings menu 430. The other settings menu 430 includes buttons for invoking various advanced settings. For example, when the user operates a button 431 ("color removal"), the GUI transitions from the other settings menu 430 to a color removal setting menu 440.

The color removal setting menu 440 includes buttons 441, 442, 443, and 444 respectively corresponding to a plurality of colors that can be selected as colors to be removed. The button 441 is a button for selecting red. The button 442 is a button for selecting green. The button 443 is a button for selecting blue. The button 444 is a button for selecting black. By operating a plurality of buttons, two or more colors may be selected as colors to be removed at the same time. Note that the candidates for the colors indicated here are only examples. More, fewer, or different colors can be selected as candidates for colors to be removed. Note that the settings related to color removal accepted via the setting GUI is not limited to the example of FIG. 4 and may include further setting items. Further setting items may include, for example, one or more of a range of brightness that should be removed, a range of density of color that should be removed, and designating a background color. The setting unit 302 sets, in the removal unit 304, the setting information related to color removal acquired via the color removal setting menu 440.

(3) Region Determination Unit

The region determination unit 303 determines or specifies, in the color image data inputted from the data acquisition unit 301, a removal region in which color removal should be executed and a non-removal region which should be excluded from being a color removal target. In this embodiment, the non-removal region includes at least graphic regions. The graphic regions correspond to regions in which a graphic element as described with reference to FIG. 2 is depicted. The region determination unit 303 may determine photographic regions in color image data in accordance with a known photographic region determination technique and treat both the graphic regions and the photographic regions as the non-removal region. In the present embodiment, regions that have not been determined as the non-removal region will be the removal region.

While scanning pixels in color image data, which is a two-dimensional pixel array, in raster scan order, for example, the region determination unit 303 sets, as a determination window, an M-row-by-N-column pixel group including a pixel of interest, with each pixel as the pixel of interest. Here, M and N are integers of 2 or more. Then, the region determination unit 303 determines whether a determination condition that variance in color in the determination window is lower than a predetermined criterion is satisfied. When the variance in color in the determination window is lower than the predetermined criterion, the region determination unit 303 determines that the pixel of interest belongs to a graphic region. Generally, a local region of a graphic element is usually rendered on a printing medium at a uniform concentration (i.e., as a solid region). However, when read by the scanner 111, the density may vary between pixels in the read image data depending on the read accuracy and noise. Therefore, determining, as graphic regions, regions in which a color is not completely uniform but the variance in color is lower than the predetermined criterion makes it possible to appropriately determine the graphic regions.

As an example, the variance in color in the determination window being lower than the predetermined criterion includes, for any color component value of any pixel of the determination window, a difference between that color component value and a corresponding average color component value calculated over the entire determination window being lower than a determination threshold. For example, portions handwritten in fluorescent ink or pencil have a tendency for density unevenness for each pixel to be relatively large. Therefore, determining whether a color component exhibiting a large deviation from an average color component value is present within the determination window in accordance with the above determination method makes it possible to accurately distinguish between such handwritten portions and graphic regions. Also, for example, although the density unevenness in portions handwritten with a ballpoint pen is not very large, characters written with pen usually have narrow line widths. Therefore, using a determination window of a size that is larger than such narrow line widths (a determination window of a relatively large area) makes it possible to accurately distinguish characters written with pen from graphic regions. Thus, the accuracy in determining the graphic region is increased. Note that color components in the above determination method may be any color components constituting any color space, such as RGB, CMY, or YUV, for example.

When the variance in color for a certain determination window is lower than the above-described criterion, the region determination unit 303 may determine that not only the pixel of interest but also the neighboring pixels included in the determination window belong to a graphic region. Then, for pixels once determined to belong to a graphic region, the region determination unit 303 may maintain the determination that the pixels belong to a graphic region regardless of the variance in color in other determination windows. That is, when two pixel groups (determination windows) whose pixels of interest are different include some pixels in common, if it is determined that the common pixels belong to a graphic region at least once during scanning, it is determined, as the final determination result, that those pixels belong to a graphic region. This avoids conflicting determination results between two or more determination windows that overlap each other at the boundary portions of the graphic elements and allows consistent graphic determination.

Figure 5:
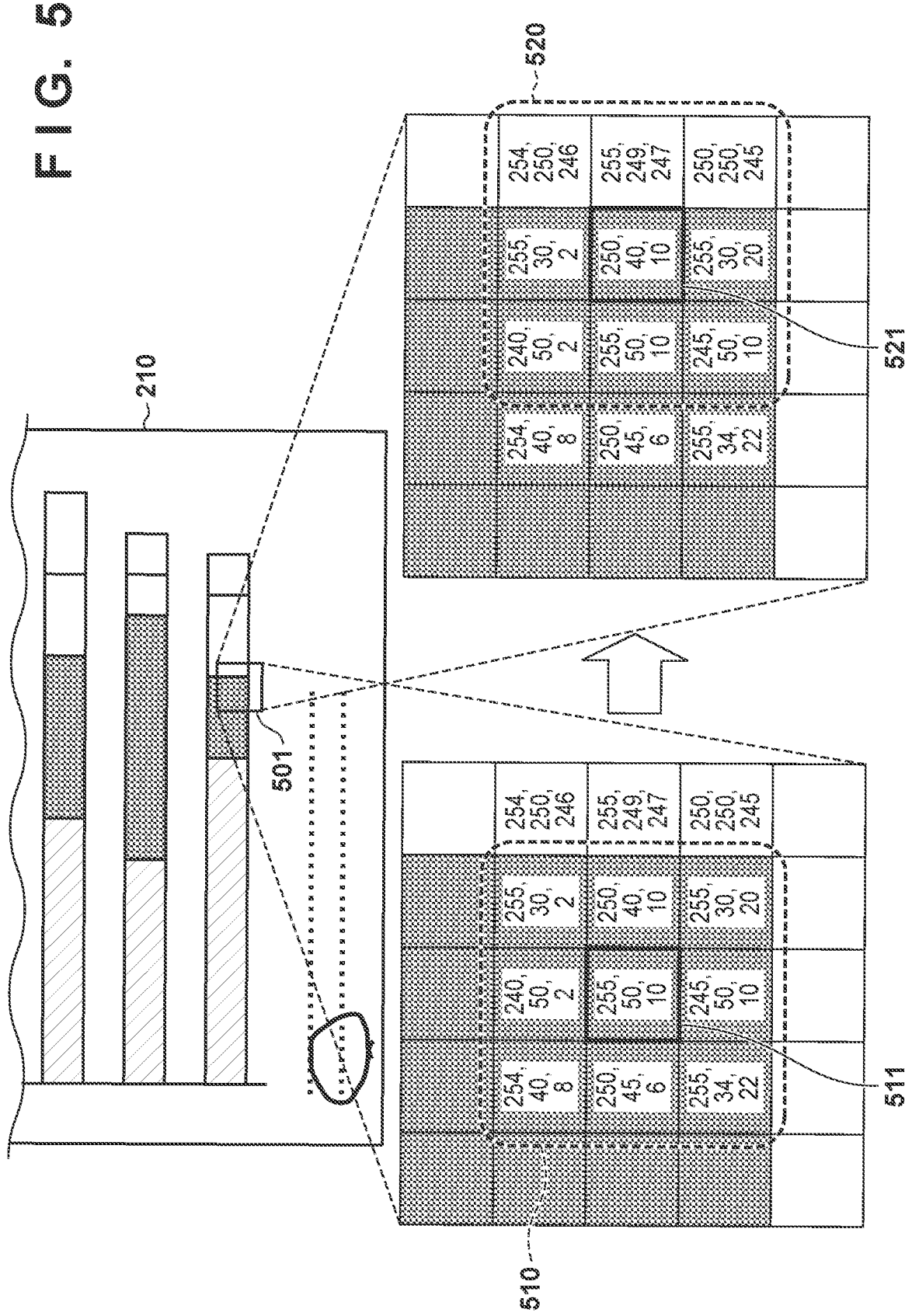
FIG. 5 is an explanatory diagram for explaining a technique for determining a graphic region according to the first embodiment.

FIG. 5 is an explanatory diagram for explaining a graphic region determination method in the present embodiment. The document 210 illustrated in FIG. 2 is illustrated in a magnified manner in the upper portion in FIG. 5 (however, the upper half of the document 210 is omitted). On the lower left and lower right in FIG. 5, pixel groups, each included in a determination window when the scanning by the region determination unit 303 reaches a position 501 of the read image data (color image data) of the document 210, are illustrated with their respective pixel values. However, the position of a lower right determination window 520 is advanced by one pixel with respect to a lower left determination window 510. Here, N=M=3 as an example, and thus, each determination window consists of nine pixels. The three values separated by commas illustrated inside a square of each pixel in the figure are color component values (R, G, B) of that pixel in an RGB color space.

The pixel group of the determination window 510 includes a pixel of interest 511 located at the center, and eight neighboring pixels to the upper left, above, upper right, left, right, lower left, below, and lower right of the pixel of interest 511. Average color component values ($R_{AVE}$, $G_{AVE}$, $B_{AVE}$) calculated over the entire determination window 510=(251, 41, 10). In addition, a color component value of a pixel within the determination window with the largest difference from the corresponding average color component value is a B component of the pixel to the lower left of the pixel of interest 511, and the difference (absolute value) is equal to 12 (=22−10). Here, when a determination threshold for graphic region determination is 30, the above difference is lower than the determination threshold. Based on the result of comparison to the threshold, the region determination unit 303 determines that the pixel of interest 511 and the eight neighboring pixels in the determination window 510 belong to a graphic region.

The pixel group of the determination window 520 includes a pixel of interest 521 located at the center, and eight neighboring pixels near the pixel of interest 521. The average color component values ($R_{AVE}$, $G_{AVE}$, $B_{AVE}$) calculated over the entire determination window 520=(251, 111, 88). In addition, a color component value of a pixel in the determination window with the largest difference from the corresponding average color component value is a B component of the pixel to the right of the pixel of interest 511, and the difference (absolute value) is equal to 159 (=247−88) and is higher than the determination threshold (=30). Here, the neighboring pixels to the upper left, above, left, lower left, and below the pixel of interest 521 and the pixel of interest 521 have already been determined to belong to a graphic region based on the determination result for the determination window 510. Therefore, the region determination unit 303 maintains the determination that these pixels belong to a graphic region. Meanwhile, the region determination unit 303 tentatively determines that the neighboring pixels to the upper right, right, and lower right of the pixel of interest 521 do not belong to a graphic region. The result of this tentative determination that a pixel does not belong to a graphic region may be overwritten based on the result of a new determination after the scan has advanced.

The region determination unit 303 repeatedly executes the above-described region determination while scanning the pixels in the color image data in order, for example. Then, the region determination unit 303 registers the pixels determined to belong to a graphic region in a memory as the pixels of the non-removal region (e.g., adding to a corresponding pixel list or marking pixels of the non-removal region). The pixels that have not been finally registered as pixels of the non-removal region constitute the removal region and will be subject to color removal by the removal unit 304 to be described later.

Note that although FIG. 5 illustrates an example in which a pixel group of 3×3 constitutes a determination window (i.e., M=N=3), the size and shape of the determination window are not limited to such an example. In some variations, the parameters M and N, which affect the size of the determination window, may be set based on the reading resolution of document reading in the scanner 111. For example, even if the widths of the handwritten lines are the same, if the reading resolution is higher, the number of pixels corresponding to a line width in the read image data will be larger. Therefore, increasing the size to which the determination window is set as the resolution at which the document reading is performed is increased makes it possible to prevent a possibility that a handwritten portion may be erroneously determined to be the non-removal region.

Further, although FIG. 5 illustrates an example in which the pixel of interest moves by one pixel in the scanning for region determination, in order to speed up the scanning, the pixel of interest may be set every n pixels in the row direction and every m rows in the column direction (m and n are integers; 1<m≤M, 1<n≤N).

(4) Removal Unit

The removal unit 304, by replacing, with a background color, a color of a pixel indicating a color (hereinafter, referred to as designated color) set by the setting unit 302 as something that should be removed from the color image data inputted from the data acquisition unit 301, removes the designated color or converts the designated color to a specific color. However, in the present embodiment, the removal unit 304 does not remove (does not convert to a background color) a color of a pixel that has been determined to belong to the non-removal region by the region determination unit 303. Here, the non-removal region includes at least the graphic regions. The background color may be predefined, for example, as white. Further, the removal unit 304 may treat a color designated by the user via the operation unit 105 as the background color or treat a color that is automatically recognized in a background region of the color image data as the background color.

More specifically, the removal unit 304, while scanning the pixels in the color image data, for example, in raster scan order, determines whether each pixel belongs to the non-removal region determined by the region determination unit 303. For pixels that do not belong to the non-removal region, if the pixel values of the pixels indicate a designated color, the removal unit 304 replaces the pixel values of the pixels with the pixel value of the background color. By repeating such determination and replacement for all pixels in the removal region, it is possible to appropriately remove a color that should be removed from the image data of a document while preventing color removal that goes against the user's intention.

<2-2. Processing Flow>

(1) Overall Flow

Figure 6:
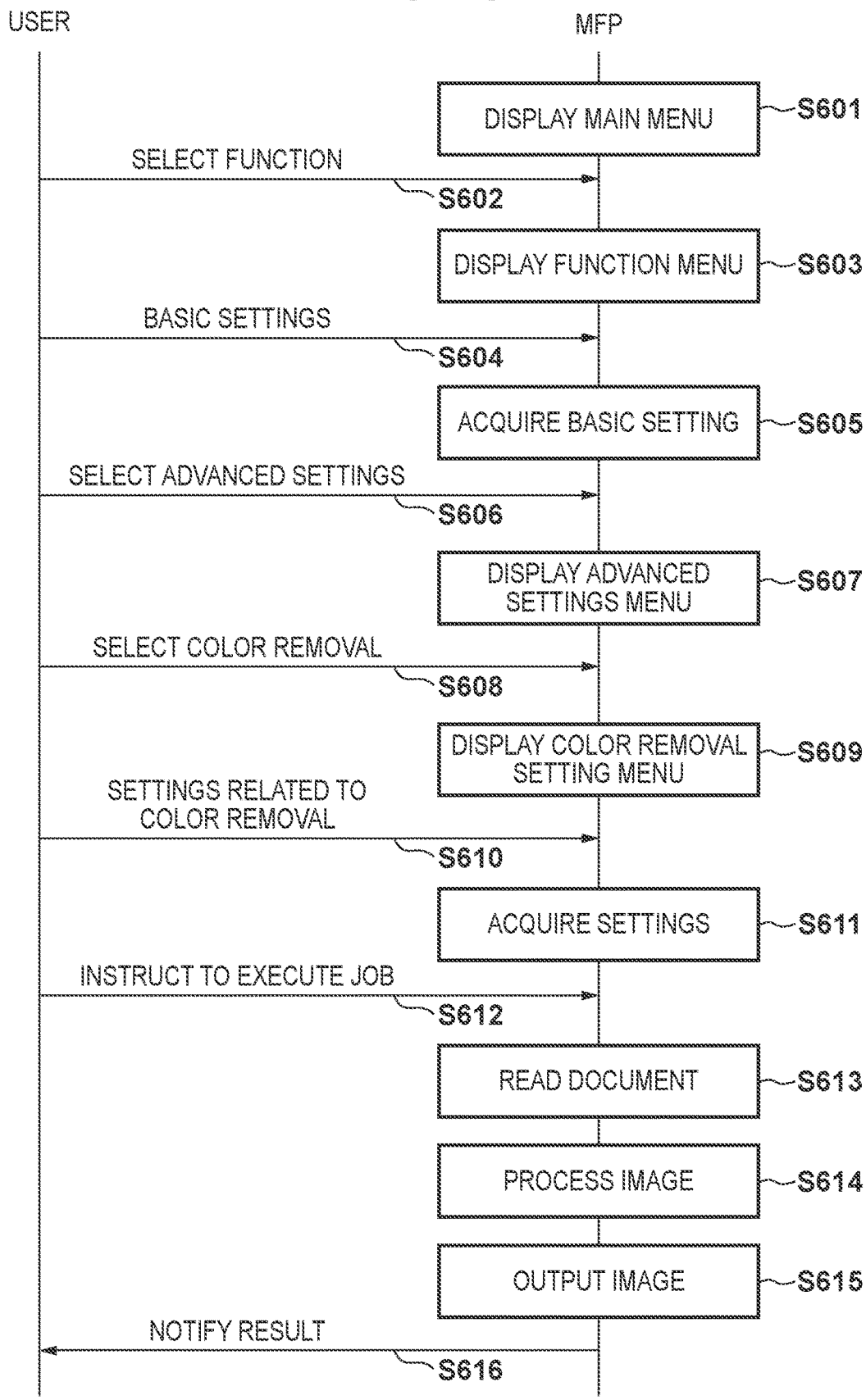
FIG. 6 is a sequence diagram illustrating a flow of basic processing performed by the multi-function peripheral together with interactions between the user and the multi-function peripheral.

FIG. 6 is a sequence diagram illustrating a flow of basic processing performed by the multi-function peripheral 100 together with interactions between the user and the multi-function peripheral 100. Note that, in the following description, processing steps will be abbreviated as S (step).

First, in S601, the operation unit 105 displays the main menu 410 on a screen. In S602, the user selects a desired function by operating a button of the main menu 410 corresponding to the desired function. Here, assume that the user selects the copy function. Next, in S603, the operation unit 105 displays the copy setting menu 420, which is a type of function menu, on the screen. In S604, the user inputs basic settings (e.g., color mode, magnification, paper size and number of copies) for the copy function in the copy setting menu 420. The setting unit 302 acquires the values of the basic settings accepted by the operation unit 105 and then stores these in a memory. In addition, in S606, the user operates the button 421 for "other settings" to perform advanced settings (advanced settings). Next, in S607, the operation unit 105 displays the other settings menu 430, which is a type of advanced settings menu, on the screen. In S608, the user who desires to remove a designated color when copying a document operates the button 431 to invoke the color removal function. Next, in S609, the operation unit 105 displays the color removal setting menu 440 on the screen. In S610, the user selects settings related to color removal (e.g., one or more colors that should be removed) in the color removal setting menu 440. In S611, the setting unit 302 acquires the values of the settings related to color removal received by the operation unit 105 and sets the values to the removal unit 304. When the required settings are completed, in S612, the user instructs the multi-function peripheral 100 to start executing a job by performing a predetermined operation (e.g., pressing a physical start key or touching a start button on the GUI). When an instruction from the user is detected by the operation unit 105, the CPU 101 causes the scanner 111 and the printer 112 to start executing a copy job. In S613, the scanner 111 reads the document and generates color image data. Next, in S614, the CPU 101 and the image processing unit 115 executes image processing including the above-described region determination and color removal for the generated color image data. In S615, the image-processed image data is outputted to the printer 112, and an image based on the image data is formed on a printing medium by the printer 112. Note that, when the user selects the scanning function instead of the copy function, the image-processed image data may be stored in a designated location or transmitted to a designated destination instead of an image being formed on a printing medium. In S616, the result of executing the job is notified to the user on the screen.

(2) Image Processing Details

FIG. 7A is a flowchart illustrating an example of a flow of image processing that may be performed by the multi-function peripheral 100 in S614 of FIG. 6. Here, the image processing can be realized, for example, by the CPU 101 executing a computer program loaded from the ROM 102 to the RAM 103 in cooperation with the image processing unit 115.

First, in S701, the setting unit 302 acquires, via the operation unit 105, setting information related to color removal including a designation of a color that should be removed. The setting unit 302 sets the acquired setting information in the removal unit 304. Next, in S703, the data acquisition unit 301 acquires the color image data of a document. Then, the data acquisition unit 301 outputs the acquired color image data to the region determination unit 303 and the removal unit 304. Next, in S705, the region determination unit 303 determines a removal region and a non-removal region in the color image data by executing the region determination process for the color image data. A more detailed flow of the region determination process performed here will be described later. Next, in S731, the removal unit 304 selects one pixel in the color image data as a pixel of interest. Next, in S733, the removal unit 304 determines whether or not the pixel of interest is a pixel in the non-removal region based on the result of the region determination process. Here, the non-removal region includes at least the graphic regions. When it is determined that the pixel of interest is not a pixel in the non-removal region (is a pixel in the removal region), in S735, the removal unit 304 determines whether the pixel value of the pixel of interest indicates the designated color. For example, when the pixel value (a three-dimensional vector comprising three color component values) of the pixel of interest is included in a sub-space in a color space corresponding to the designated color, the removal unit 304 may determine that the pixel value of the pixel of interest indicates the designated color. When it is determined that the pixel value of the pixel of interest indicates the designated color, in step S737, the removal unit 304 replaces the color of the pixel of interest with a background color. Meanwhile, when it is determined that the pixel value of the pixel of interest does not indicate the designated color, the removal unit 304 does not replace the color of the pixel of interest with the background color. If it is determined in S733 that the pixel of interest is a pixel in the non-removal region, the processing steps, S735 and S737, will be skipped. Next, in S739, the removal unit 304 determines whether unprocessed pixels remain in the color image data. If unprocessed pixels remain, the process returns to S731, the next pixel is selected as the pixel of interest, and S733 to S739 are repeated. When no unprocessed pixel remains, the image processing in FIG. 7A ends.

(3) Region Determination Process Details

Figure 7B:
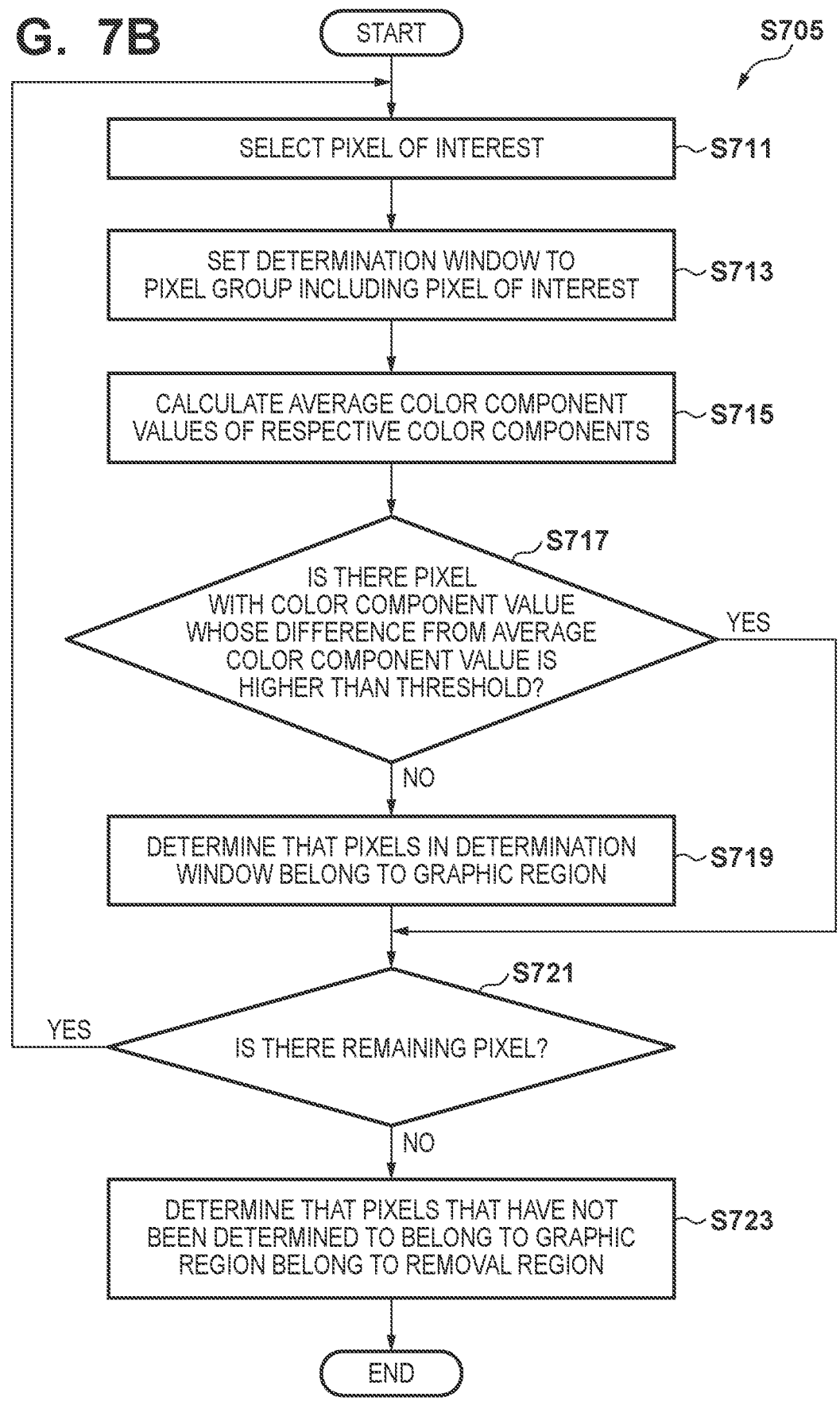
FIG. 7B is a flowchart illustrating an example of a detailed flow of a region determination process according to the first embodiment.

FIG. 7B is a flowchart illustrating an example of a detailed flow of a region determination process that may be performed by the multi-function peripheral 100 in S705 of FIG. 7A. Here, the region determination process can be realized, for example, by the CPU 101 executing a computer program loaded from the ROM 102 to the RAM 103 in cooperation with the image processing unit 115.

First, in S711, the region determination unit 303 selects one pixel in the color image data as a pixel of interest. Next, in S713, the region determination unit 303 sets a determination window to a pixel group including the pixel of interest. Next, in S715, the region determination unit 303 calculates, for example, the average color component values of respective RGB color components over the entire determination window. Next, in S717, the region determination unit 303 determines whether there is a pixel with a color component value whose difference from the corresponding average color component value is higher than the determination threshold in the determination window. If there is no such a pixel in the determination window, in S719, the region determination unit 303 determines that the pixels in the determination window belong to a graphic region. Meanwhile, if the difference between the color component value and the corresponding average color component value is lower than the determination threshold for any color component value of any pixel in the determination window, the processing step S719 will be skipped. Note that, although not illustrated in the drawing, the region determination unit 303 may perform determination as to whether the pixel of interest belongs to another type of non-removal region (for example, a photographic region) in addition to the graphic region determination in S719. Next, in S721, the region determination unit 303 determines whether unprocessed pixels remain in the color image data. If unprocessed pixels remain, the process returns to S711, the next pixel is selected as the pixel of interest, and S713 to S721 are repeated. When no unprocessed pixel remains, in S723, the region determination unit 303 determines that the pixels that have not been determined to belong to a graphic region (and other types of non-removal region) belong to the removal region. Then, the region determination process of FIG. 7B ends.

3. Second Embodiment

In the first embodiment, an example of treating graphic regions as the non-removal region has been mainly explained. In this section, as a second embodiment, an example in which a user is enabled to explicitly designate a non-removal region or a removal region on the screen will be described.

<3-1. Functional Configuration>

Figure 8:
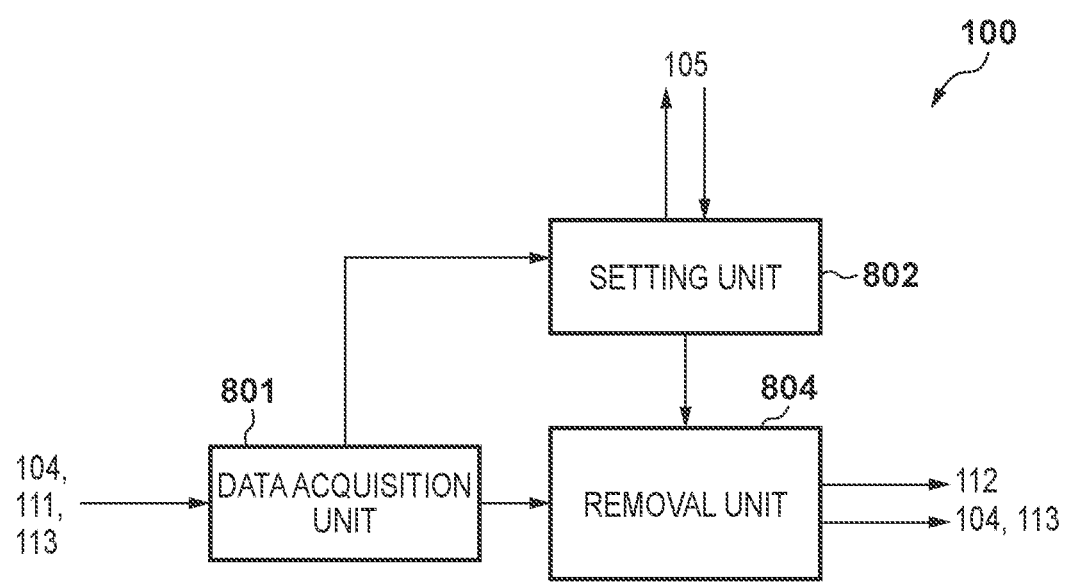
FIG. 8 is a block diagram illustrating an example of a logical configuration of a multi-function peripheral according to a second embodiment.

FIG. 8 is a block diagram illustrating an example of a logical configuration of the multi-function peripheral 100 according to the second embodiment. Referring to FIG. 8, the multi-function peripheral 100 includes a data acquisition unit 801, a setting unit 802, and a removal unit 804.

(1) Data Acquisition Unit

The data acquisition unit 801 acquires color image data of a document in the same manner as the data acquisition unit 301 according to the first embodiment and outputs the acquired color image data to the setting unit 802 and the removal unit 804.

(2) Setting Unit

The setting unit 802 acquires setting information related to removal of color from color image data via the operation unit 105 and sets the acquired setting information in the removal unit 804. The color-removal-related setting information includes the designated color designated by the user as something that should be removed. In addition, in the present embodiment, the color-removal-related setting information includes the region information indicating the non-removal region or the removal region designated by the user. For example, the setting unit 802 displays a GUI for accepting the designation of a region on the screen of the operation unit 105 together with a preview image based on the color image data and then acquires the region information based on a detected user input.

Figure 9:
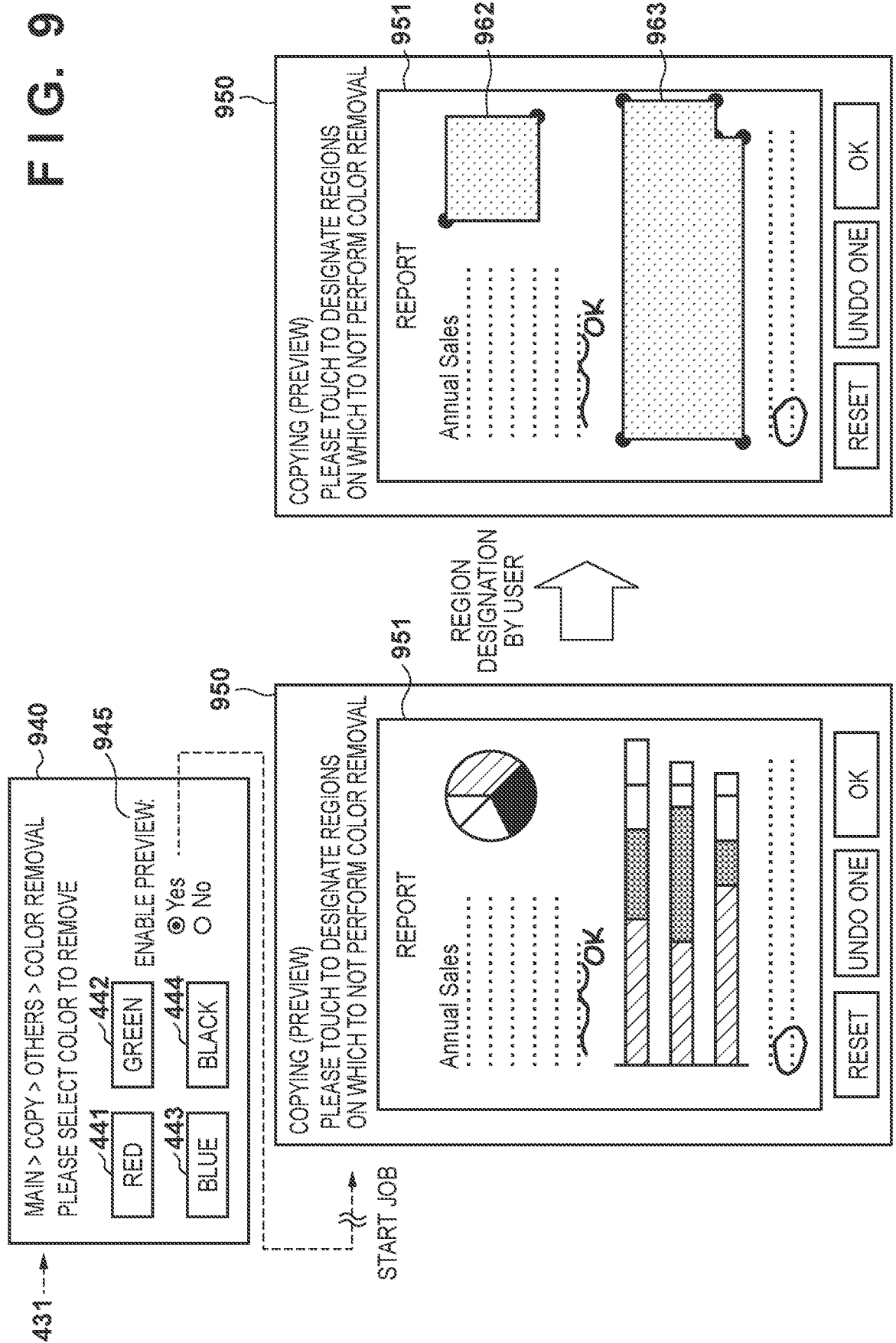
FIG. 9 is an explanatory diagram for explaining an example of a setting GUI that can be displayed on a screen in the second embodiment.

FIG. 9 illustrates an example of a GUI that can be displayed on the screen of the operation unit 105 in the present embodiment. In the second embodiment, when the user operates the button 431 ("color removal") in the other settings menu 430 illustrated in FIG. 4, a color removal setting menu 940 illustrated on the upper left of FIG. 9 is displayed. The color removal setting menu 940 includes a check box 945 in addition to the buttons 441, 442, 443, and 444 corresponding to respective color choices. The check box 945 is a UI for prompting the user to select whether or not to display a preview at the start of a job (before printing is performed). When the execution of a copy job is started with "enable preview display" ("Yes") selected, the operation unit 105 displays the preview image 951 based on the color image data of the document read by the scanner 111 on the screen 950. Then, the operation unit 105 receives, on this screen, a designation of a region by the user. For example, the region may be designated by a two-point designation method in which two vertices of the upper left and lower right of a rectangular region are designated by a drag operation or two touch operations. In addition, the region may be designated by a multi-point designation method in which the vertices of a polygonal region are sequentially designated by multiple touch operations. On the lower right of FIG. 9, a region 962 designated by the two-point designation method and a region 963 designated by the multi-point designation method are illustrated. The operation unit 105 displays an object for masking each region over the preview image 951 so that the designated region is distinguishable by the user. Here, it is assumed that the regions 962 and 963 are designated as non-removal regions, which will not be a target of execution of color removal. The setting unit 802 sets or specifies, as the color-removal-related setting information in the removal unit 804, the region information acquired via the region designation on the preview image.

(3) Removal Unit

Based on the region information set or specified by the setting unit 802, the removal unit 804 removes the designated color from the color image data inputted from the data acquisition unit 801 by replacing the color of the pixel indicating the designated color with the background color. In a first example of the second embodiment, the region information indicates the non-removal region(s) designated by the user. In this case, the removal unit 304 does not remove the designated color in the non-removal region(s) and removes the designated color in the remaining region. In a second example of the second embodiment, the region information indicates the removal region(s) designated by the user. In this case, the removal unit 304 removes the designated color only in the removal region(s). As described above, the background color may be predefined as white, for example; designated by a user; or determined automatically based on the inputted color image data.

More specifically, the removal unit 804, while scanning the pixels in the color image data, determines whether each pixel belongs to a region indicated by the region information. In the first example, for pixels that do not belong to any non-removal region indicated by the region information, the removal unit 804 replaces the pixel values of the pixels with the pixel value of the background color when the pixel values of the pixels indicate the designated color. In the second example, for pixels that belongs to a removal region indicated by the region information, the removal unit 804 replaces the pixel values of the pixels with the pixel value of the background color when the pixel values of the pixels indicate the designated color. By repeating such determination and replacement, it is possible to appropriately remove the color that should be removed from the image data of the document while reliably avoiding the execution of color removal that goes against the explicit intention of the user.

<3-2. Processing Flow>

The flow of the basic processing performed by the multi-function peripheral 100 in the second embodiment may be roughly the same as the flow described with reference to FIG. 6. However, in the second embodiment, after the document is read in step S613, at the beginning of image processing in S614, the display of the preview image and the acceptance of region designation are performed by the operation unit 105.

Figure 10:
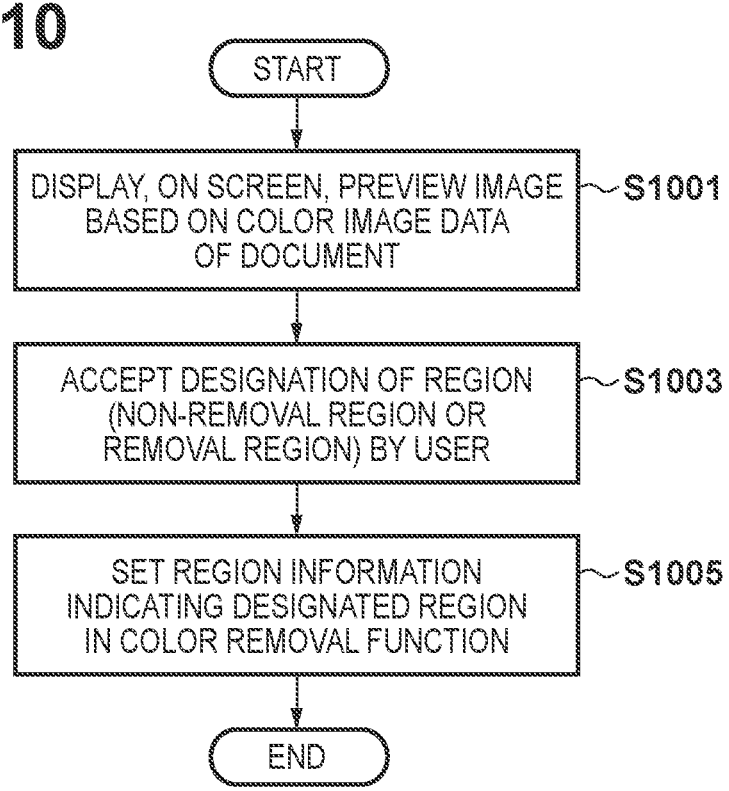
FIG. 10 is a flowchart illustrating an example of a detailed flow of a region setting process according to the second embodiment.

The flow of the image processing that corresponds to S614 of FIG. 6 in the second embodiment may be roughly the same as the flow described with reference to FIG. 7A. However, in the second embodiment, in S705, a region setting process illustrated in FIG. 10 is performed by the setting unit 802 instead of the region determination process illustrated in FIG. 7B. Further, in S733, it is determined whether or not the pixel of interest is a pixel in a non-removal region based on the region information indicating the region designated by the user.

FIG. 10 is a flowchart illustrating an example of a detailed flow of a region setting process that may be performed by the multi-function peripheral 100 in the second embodiment. Here, the region setting process can be realized, for example, by the CPU 101 executing a computer program loaded from the ROM 102 to the RAM 103 in cooperation with the image processing unit 115.

First, in S1001, the setting unit 802 displays, on the screen of the operation unit 105, a preview image (for example, a low-resolution image) based on the color image data of the document. Next, in S1003, the operation unit 105 receives designation of a region by the user in the method described with reference to FIG. 9, for example. The region designated here is either a non-removal region or a removal region. Then, in S1005, the setting unit 802 acquires the region information indicating the designated region, and sets the acquired region information in the removal unit 804. Then, the region setting process of FIG. 10 ends.

4. Third Embodiment

In a third embodiment, it is determined whether or not to remove the color of each pixel based on both the result of determination of the graphic region and explicit region designation by the user.

<4-1. Functional Configuration>

Figure 11:
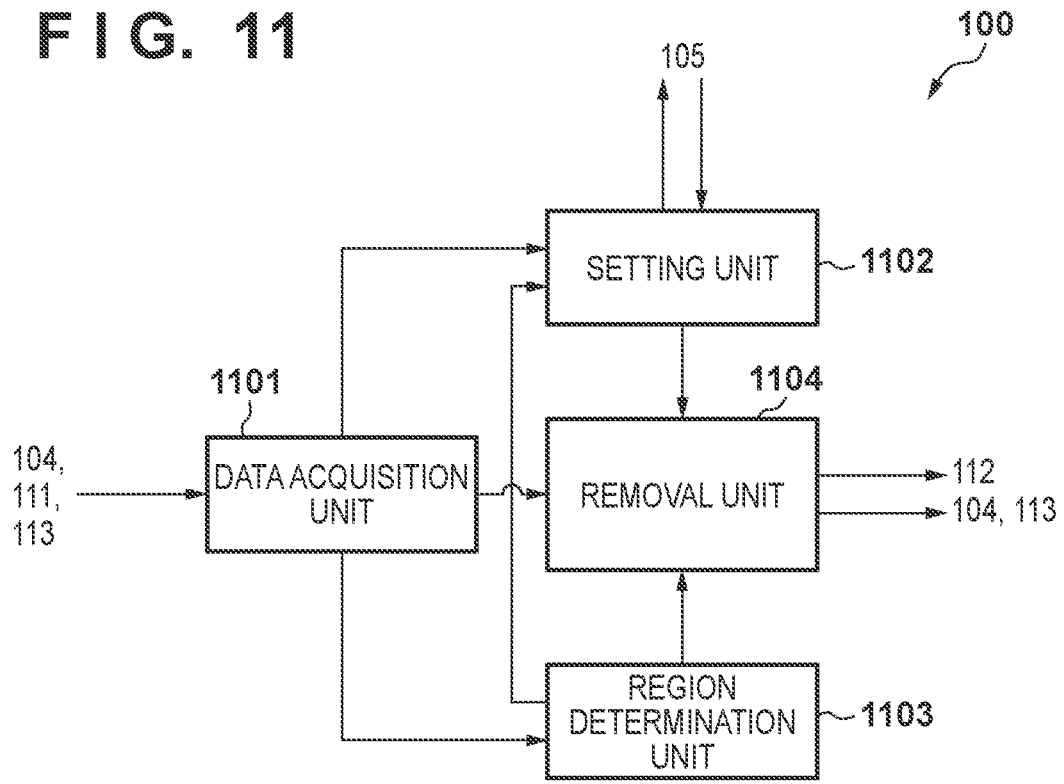
FIG. 11 is a block diagram illustrating an example of a logical configuration of a multi-function peripheral according to a third embodiment.

FIG. 11 is a block diagram illustrating an example of a logical configuration of the multi-function peripheral 100 according to the third embodiment. Referring to FIG. 11, the multi-function peripheral 100 includes a data acquisition unit 1101, a setting unit 1102, a region determination unit 1103, and a removal unit 1104.

(1) Data Acquisition Unit

The data acquisition unit 1101 acquires color image data of a document in the same manner as the data acquisition unit 301 according to the first embodiment, and outputs the acquired color image data to the setting unit 1102, the region determination unit 1103, and the removal unit 1104.

(2) Region Determination Unit

The region determination unit 1103 determines or specifies a non-removal region which should be excluded from being a color removal target in the color image data inputted from the data acquisition unit 1101. In this embodiment, the non-removal region includes at least a graphic region. The region determination unit 1103 may determine the graphic region in the color image data in the same method as the region determination unit 303 according to the first embodiment. The non-removal region may further include a photographic region. The region determination unit 1103 outputs the result of the region determination to the setting unit 1102 and the removal unit 1104.

(3) Setting Unit

The setting unit 1102 acquires setting information related to removal of color from color image data via the operation unit 105 and sets the acquired setting information in the removal unit 1104. The color-removal-related setting information includes the designated color designated by the user as something that should be removed. In addition, in the present embodiment, the color-removal-related setting information includes the region information indicating a non-removal region or a removal region. For example, the setting unit 1102 displays the preview image on the screen of the operation unit 105 so that the graphic region determined by the region determination unit 1103 is distinguishable by the user on the screen. Then, the setting unit 1102 acquires the region information modified based on a user input detected on the screen.

Figure 12:
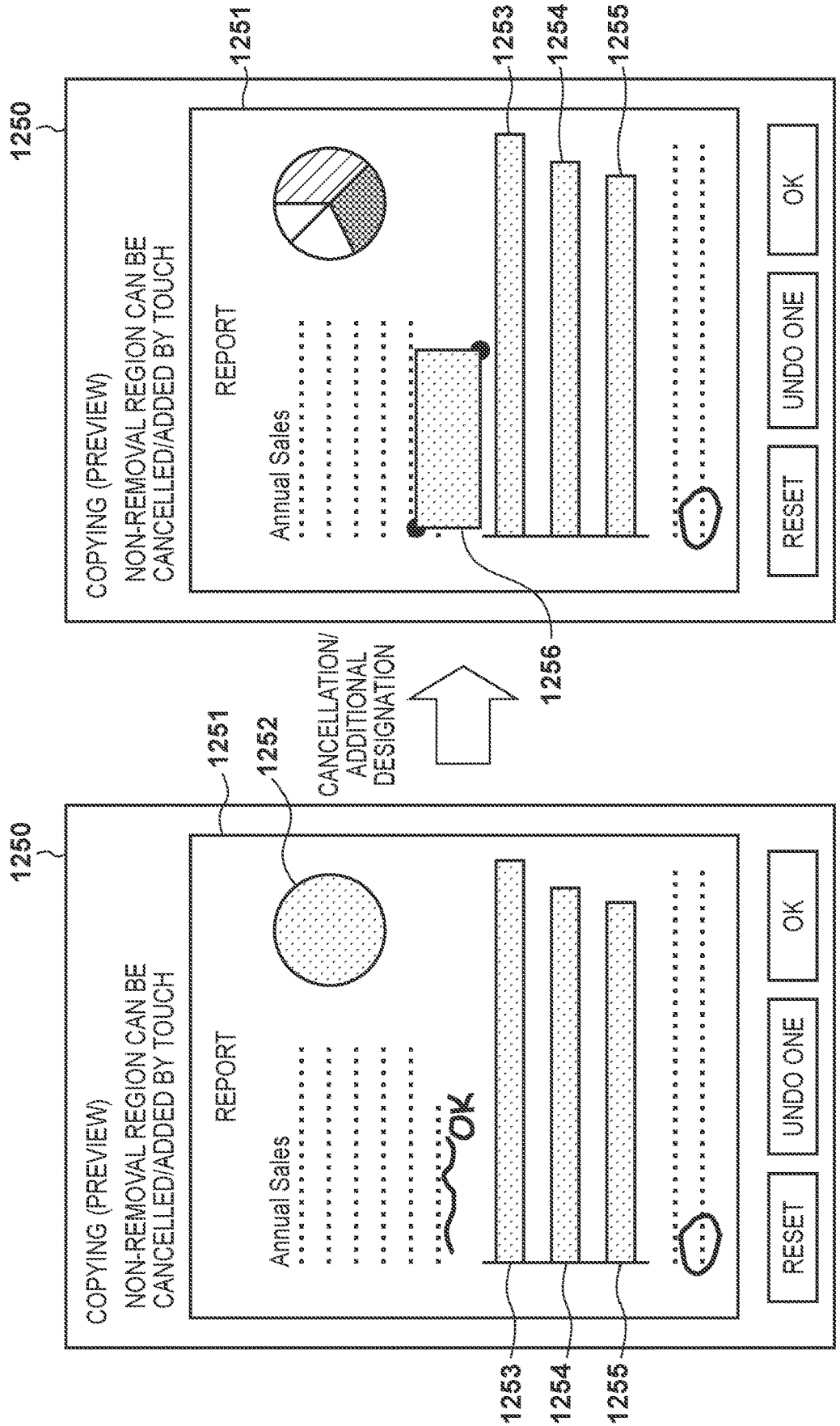
FIG. 12 is an explanatory diagram for explaining an example of a setting GUI that can be displayed on a screen in the third embodiment.

FIG. 12 illustrates an example of a GUI that can be displayed on the screen of the operation unit 105 in the present embodiment. In the third embodiment, it is also assumed that the operation unit 105 displays, on the screen, the color removal setting menu 940 having the check box 945 exemplified in FIG. 9 and prompts the user to select whether or not to display the preview at the start of a job. When the execution of a copy job is started with the preview display enabled, the operation unit 105 displays, on a screen 1250, a preview image 1251 based on the color image data of the document read by the scanner 111 as illustrated on the left of FIG. 12. In this example, in the preview image 1251, regions 1252, 1253, 1254, and 1255 determined to be the graphic region are masked so that they are distinguishable by the user. Note that, instead of being concealed by masking, each region may be surrounded, for example, by a line indicating the boundary of the region, or a translucent object may be superimposed. These regions, if not cancelled by the user, are treated as non-removal regions in subsequent color removal processing. The operation unit 105 accepts cancellation or additional designation of a non-removal region by the user on this screen. For example, cancellation of a non-removal region may be performed by a touch operation to the region determined to be a graphic region. An additional designation of a region may be performed using the above two-point designation method or multi-point designation method. On the right of FIG. 12, a preview image 1251 modified by the user is illustrated, and a region 1252 is no longer a non-removal region. Meanwhile, a region 1256 has been newly and additionally designated as a non-removal region. The setting unit 1102 sets, as the color-removal-related setting information in the removal unit 1104, the region information acquired as the result of modification of the non-removal regions in the preview image.

(4) Removal Unit

Based on the region information set or specified by the setting unit 1102, the removal unit 1104 removes the designated color from the color image data inputted from the data acquisition unit 1101 by replacing the color of the pixel indicating the designated color with the background color (or converting the color of the pixel to a specific color). As described above, the background color may be, for example, white, a color designated by the user, or an automatically-determined color.

For example, among the regions determined to be a graphic region by the region determination unit 1103, the removal unit 1104 treats, as the non-removal region, a region for which setting as the non-removal region has not been cancelled by the user and does not remove the designated color in that region. Meanwhile, among the regions determined to be a graphic region by the region determination unit 1103, the removal unit 1104 treats, as the removal region, a region for which setting as the non-removal region has been cancelled by the user and removes the designated color in that region. In addition, among the regions determined to be a graphic region, the removal unit 1104 treats, as the non-removal region, a region for which designation as the non-removal region has been added by the user and does not remove the designated color in that region. Meanwhile, the removal unit 1104 treats, as a removal region, a region that is not determined to be a graphic region and for which designation as the non-removal region has not been added and removes the designated color in that region. Such combination of region determination and user designation makes it possible to appropriately remove the color that should be removed from the image data of the document while reducing the burden of operation for region designation on the user and reliably avoiding the execution of color removal that goes against the intention of the user.

<4-2. Processing Flow>

The flow of the basic processing performed by the multi-function peripheral 100 in the third embodiment may be roughly the same as the flow described with reference to FIG. 6. However, in the third embodiment, after the document is read in step S613, at the beginning of image processing in S614, the display of the preview image and the acceptance of region information modification are performed by the operation unit 105.

Figure 13:
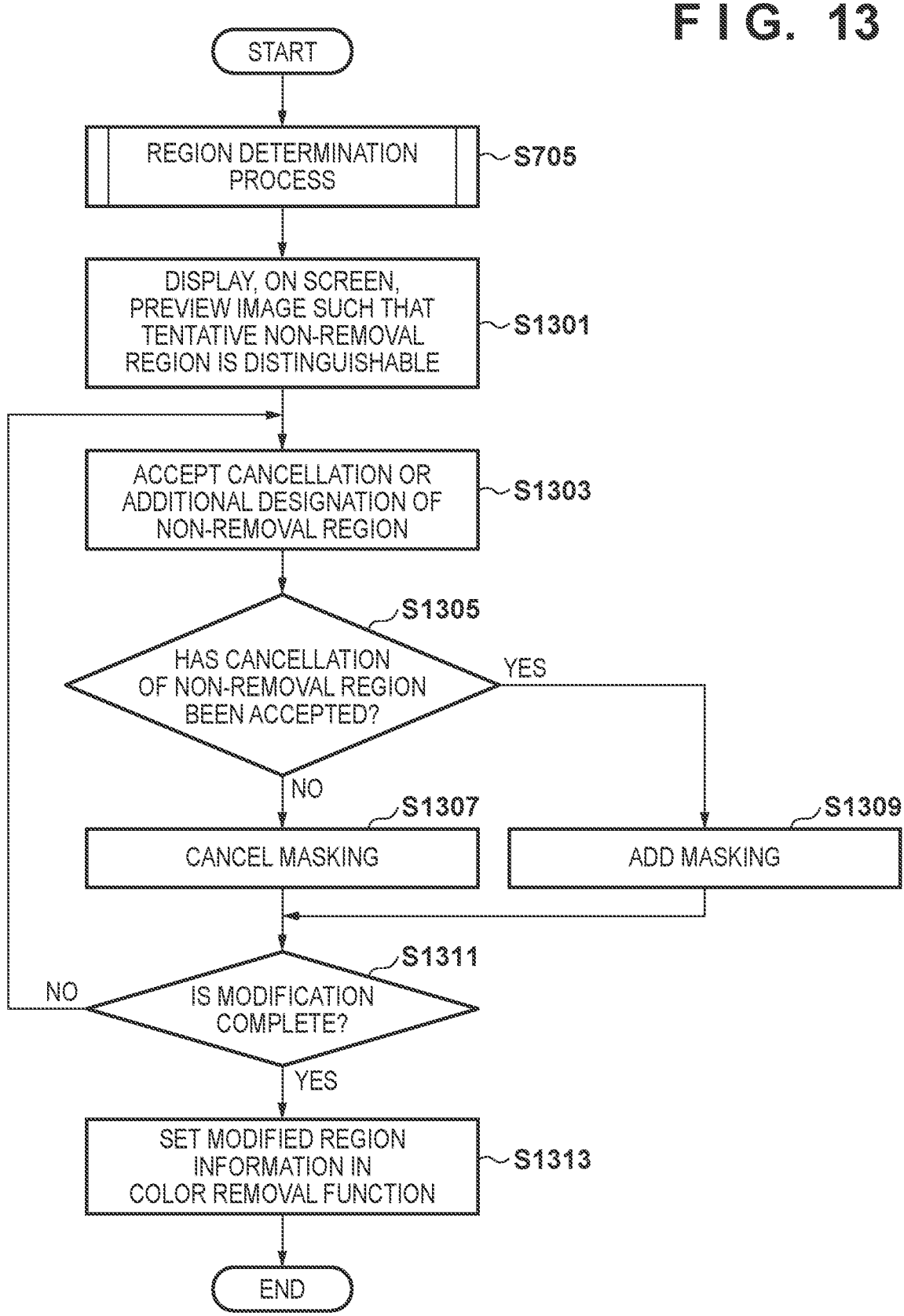
FIG. 13 is a flowchart illustrating an example of a detailed flow of a region setting process according to the third embodiment.

The flow of the image processing that corresponds to S614 of FIG. 6 in the third embodiment may be roughly the same as the flow described with reference to FIG. 7A. However, in the third embodiment, as illustrated in FIG. 13, the region setting process is performed by the setting unit 1102 after the region determination process in step S705. Further, in the third embodiment, in step S733, it is determined whether or not the pixel of interest is a pixel in a non-removal region based on the result of region determination by the region determination unit 1103 and the result of region information modification by the user.

FIG. 13 is a flowchart illustrating an example of a detailed flow of a region setting process that may be performed by the multi-function peripheral 100 in the third embodiment. Here, the region setting process can be realized, for example, by the CPU 101 executing a computer program loaded from the ROM 102 to the RAM 103 in cooperation with the image processing unit 115.

In FIG. 13, it is illustrated that the region determination process (S705) described with reference to FIG. 7B by the region determination unit 1103 prior to the region setting process is performed. Next, in 51301, the setting unit 1102 displays a preview image on the screen of the operation unit 105 so that a region (i.e., a temporary non-removal region) determined to be a graphic region as a result of the region determination process is distinguishable on the screen. Next, in 51303, the operation unit 105 receives cancellation of a non-removal region or an additional designation of a non-removal region based on a user input, as described with reference to FIG. 12. Subsequent processing branches in S1305 depending on whether the accepted operation represents a cancellation of a non-removal region or an additional designation of a non-removal region. When the cancellation of the non-removal region has been accepted, in S1307, the operation unit 105 cancels, on the screen, the masking of the designated non-removal region. In this case, the setting for the region is modified from the non-removal region to the removal region. Meanwhile, when the additional designation of the non-removal region has been accepted, in 51309, the operation unit 105 masks the designated region on the screen as a new non-removal region. In this case, the setting for the region is modified from the removal region to the non-removal region. Such user interaction continues until the modification of the region information is completed (for example, the user touches the "OK" button) (S1311). When the modification of the region information is completed, in S1313, the setting unit 1102 acquires the modified region information as the color-removal-related setting information and sets the acquired setting information in the removal unit 1104. Then, the region setting process of FIG. 13 ends.

5. Summary

So far, several embodiments have been described in detail with reference to FIGS. 1 to 13. In some embodiments, in the image processing apparatus in which a designated color is removed from the color image data of a document by replacing the color of a pixel with a background color (converting the color of a pixel to a specific color), a graphic region in the color image data is determined (specified), and the determined graphic region is excluded from a target of color removal (the color conversion for the specified graphic region is skipped). According to this configuration, with respect to the image data of the document including the graphic region, it is possible to appropriately remove from the image data the contents written in the designated color while preventing undesired deterioration in image quality.

In other embodiments, in the image processing apparatus in which a designated color is removed from the color image data of a document by replacing the color of a pixel with a background color (converting the color of a pixel to a specific color), a designation of a region by the user on a preview image is accepted (the region is specified), and color removal (color conversion) is controlled based on that region designation. By virtue of such a configuration, it is possible to appropriately remove a color that should be removed from image data while reliably avoiding the execution of color removal that goes against the explicit intention of the user.

In yet another embodiment, it is switched whether or not to perform color removal (whether to skip color conversion) based on both the determination of the graphic region and the region designation by the user. By virtue of such a configuration, if the user desires to remove a specific color regardless of it being in a graphic region, for example, color removal can be performed as desired by the user. It is also possible to avoid performing color removal for regions that are not graphic regions but which the user wishes to exclude from performing color removal.

6. Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-021064, filed on Feb. 12, 2021 which is hereby incorporated by reference herein in its entirety.

What is claimed is:

1. An image processing apparatus comprising:
a reader configured to read a document to generate a document image; and
processing circuitry configured to:
receive an input to designate a color;
specify a graphic region in the document image and a removal region in the document image, the removal region being a region other than the specified graphic region; and convert a color of a pixel of interest in the removal region whose color corresponds to the designated color to a specific color, wherein the processing circuitry is configured not to convert a color of a pixel in the specified graphic region of the document image to the specific color.

2. The image processing apparatus according to claim 1, wherein the processing circuitry is further configured to convert, within the document image, a color of a pixel of a character corresponding to the designated color to the specific color without converting a color of a pixel in the specified graphic region to the specific color.

3. The image processing apparatus according to claim 1, wherein the processing circuitry is further configured to determine that a pixel of interest belongs to the specified graphic region in a case where a variance in color within a M-by-N pixel group (M and N are integers larger than one) including the pixel of interest is lower than a predetermined criterion.

4. The image processing apparatus according to claim 3, wherein the variance in color within the pixel group being lower than the predetermined criterion includes, for any color component value of any pixel of the pixel group, a difference between that color component value and a corresponding average color component value calculated over the pixel group being lower than a threshold.

5. The image processing apparatus according to claim 3, wherein the processing circuitry is further configured to determine that a first pixel as a pixel of interest and a second pixel as a neighboring pixel belong to the specified graphic region in a case where the variance in color within a first pixel group including the first pixel and the second pixel is lower than the predetermined criterion, and to maintain the determination that the second pixel belongs to the specified graphic region regardless of a variance in color within a second pixel group that is different from the first pixel group, the second pixel group including the second pixel.

6. The image processing apparatus according to claim 3, wherein M and N are set based on reading resolution of the document.

7. The image processing apparatus according to claim 1, wherein the specific color is white.

8. The image processing apparatus according to claim 1, further comprising:

a user interface configured to cause a preview image based on the document image to be displayed on a screen such that the specified graphic region is distinguishable as a non-removal region by the user, wherein the user interface is configured to accept a modification of the non-removal region to a removal region by the user, and the processing circuitry is further configured to perform the conversion to the specific color in the specified graphic region modified to the removal region.

9. The image processing apparatus according to claim 8, wherein the user interface is configured to accept an additional designation of a non-removal region by the user, and the processing circuitry is further configured not to perform the conversion to the specific color in the non-removal region that has been designated.

10. The image processing apparatus according to claim 1, further comprising: a printer configured to print, on a sheet, an image for which the conversion to the specific color has been performed.

11. An image processing method performed by processing circuitry of an image processing apparatus that includes a reader, the method comprising:

causing the reader to read a document to generate a document image;

receiving an input to designate a color;

specifying a graphic region in the document image and a removal region in the document image, the removal region being a region other than the specified graphic region;

converting a color of a pixel of interest in the removal region whose color corresponds to the designated color to a specific color; and skipping conversion of a color of a pixel in the specified graphic region of the document image to the specific color.

12. A non-transitory computer-readable storage medium having stored therein a computer program which, when executed by a processor of an image processing apparatus, causes the image processing apparatus to perform operations comprising:

causing a reader of the image processing apparatus to read a document to generate a document image;

receiving an input to designate a color;

specifying a graphic region in the document image and a removal region in the document image, the removal region being a region other than the specified graphic region;

converting a color of a pixel of interest in the removal region whose color corresponds to the designated color to a specific color; and skipping conversion of a color of a pixel in the specified graphic region of the document image to the specific color.

* * * * *